United States Patent [19]

Greene et al.

[11] 3,910,785

[45] Oct. 7, 1975

[54] METHOD OF PREPARING A METAL POWDER MAINLY CONSISTING OF IRON

[75] Inventors: Peter Townsend Greene, Salfords, near Redhill, England; Hans Rau, Laurensberg; Joachim Rolf Wegener, Oberforstbach, both of Germany

[73] Assignee: U.S. Philips Corporation, New York, N.Y.

[22] Filed: May 1, 1974

[21] Appl. No.: 465,903

[30] Foreign Application Priority Data

May 3, 1973 Netherlands .......................... 7306143

[52] U.S. Cl. .................................. 75/5 BA; 148/105

[51] Int. Cl.² .......................................... H01F 1/30

[58] Field of Search ........ 75/.5 BA, .5 AA; 148/105

[56] References Cited

UNITED STATES PATENTS

| | | | |
|---|---|---|---|
| 3,598,568 | 8/1971 | Klomp et al. | 148/105 |
| 3,627,509 | 12/1971 | van der Giessen et al. | 75/.5 BA |
| 3,748,119 | 7/1973 | Hwang et al. | 75/.5 BA |
| 3,837,839 | 9/1974 | Rau et al. | 75/.5 BA |

*Primary Examiner*—W. Stallard
*Attorney, Agent, or Firm*—Frank R. Trifari; Carl P. Steinhouser

[57] ABSTRACT

A method of preparing a metal powder for magnetic tapes mainly consisting of iron by reducing acicular iron oxide particles or iron oxide hydrate particles which contain 0.1 to 10 at. % of titanium related to the iron, the iron particles thereafter being dispersed in an organic binder system.

4 Claims, No Drawings

METHOD OF PREPARING A METAL POWDER MAINLY CONSISTING OF IRON

The invention relates to a method of preparing a metal powder mainly consisting of iron by reduction of finely divided acicular iron oxide or iron oxide hydrate with a gaseous reduction agent.

In preparing an acicular metal powder which mainly consists of iron it is known to start from finely divided acicular iron oxide particles or iron oxide hydrate particles which contain a small quantity of another element, which means that the iron oxide particles or iron oxide hydrate particles are doped with said other element or that the iron oxide particles or iron oxide hydrate particles are covered with a layer of a compound of said other element. In this manner powders have been prepared, for example, which show magnetic properties which make them useful as a material for magnetic recording. It is of importance that the particles maintain their acicular shape during the preparation.

It has now been found that a particular choice of the other element presents great advantages in manufacturing a magnetic tape in which the metal powder is dispersed in an organic binder system, if the metal powder shows a very good dispersibility due to the relevant choice. Further advantages are in the permissible reduction temperature.

According to the invention the iron oxide particles or the iron oxide hydrate particles contain at least 0.1 at % and at most 10 at. % of titanium related to the iron. The good dispersibility of the metal particles thus prepared appears from the directivity ratio of a magnetic tape manufactured with said particles. Furthermore the needle shape of the particles is maintained during the reduction also when high reduction temperatures are used, which appears inter alia from the coercive force of the metal particles.

The iron oxide particles or the iron oxide hydrate particles preferably contain at least 0.2 at.% and at most 4 at. % of titanium relates to the iron, since good results have been realised with this composition.

The iron oxide particles or the iron oxide hydrate particles are in particular doped with titanium. During the preparation of the particles, a precipitate is formed from a solution of an iron salt and a titanium salt. In this manner iron and titanium are united in a simple manner.

In another case the iron oxide particles or the iron oxide hydrate particles are covered with a layer of a titanium compound. For that purpose the finely divided iron oxide or iron oxide hydrate is suspended in a dilute titanium salt solution.

It is to be noted that British Patent Specification No. 1,122,637 describes a method of stabilising iron oxide hydrate in which the iron oxide hydrate is treated with an aqueous solution of a titanium salt. The stabilised iron oxide hydrate may be used as a starting material for the preparation of iron oxide to be used for magnetic recording. In connection herewith it is to be considered that a method of preparing iron oxide cannot be compared as such with a method of preparing a metal powder mainly consisting of iron, because in the latter case the original oxide lattice of the starting particles is fully lost.

For comparison with powder prepared according to the method of the invention, first a number of powders were prepared not according to the method of the invention, namely iron powders, tin-containing iron powders and an iron powder obtained by reduction of $\alpha$-FeOOH particles covered with bismuth oxide. The preparation of the powders to be reduced is described in examples 1, 2 and 3, while the reduction was carried out either in the manner as described in example 6, or in the manner as described in example 7. Examples 4 and 5 relate to the preparation according to the invention of powders to be reduced, while the reduction in these cases also was carried out either in the manner as described in Example 6, or in the manner as described in Example 7.

EXAMPLE 1

A flow of nitrogen of 12 liters per minute was led through a solution of 417 g of $FeSO_4.7H_2O$ in 5.7 liters of deionised water which furthermore contained 15 ml of concentrated $H_2SO_4$ at 45°C. 2.3 litres of a 10 molar NaOH solution were then added, a precipitate of iron hydroxide being formed. The formed suspension was heated to 45°C and a flow of air of 12 liters per minute was led through, the precipitate being oxidized; after approximately 16 hours the reaction was completed. The product, acicular $\alpha$-FeOOH particles having a length of on an average 0.4 $\mu$m and a thickness of on an average 0.02 $\mu$m was filtered off, washed with water in a centrifuge to a pH of 5 to 6, washed with acetone and dried in a vacuum furnace at 80°C (powder 1).

EXAMPLE 2

To a solution of 10 kg of $FeSO_4.7H_2O$ in 70 litres of deionised water which furthermore contained 55 ml of concentrated $H_2SO_4$ were added a solution of 17 kg of NaOH in 64 litres of deionised water and an alkaline $Sn^{2+}$— solution which contained 82 g of $SnCl_2.2H_2O$, a precipitate of tin-containing iron hydroxide being formed which contained 1 at.% of Sn related to the iron. A flow of air of approximately 40 liters per minute was then passed through, the precipitate being oxidized; after 24 hours the reaction was completed. The product, acicular tin-containing $\alpha$-FeOOH particles, was filtered off, washed with water and dried at 80°C (powder 2).

EXAMPLE 3

4.85 g of water-insoluble $4Bi(NO_3)(OH)_2.BiOOH$ were dissolved in 50 ml of $H_2O$ and 50 ml of 3 molar $HNO_3$and this solution was heated to 90°C so as to obtain a bright solution. A solution of 5 g of mannitol in 50 ml of $H_2O$ was added to the solution, 15 ml of the resulting solution were added to 11.1 g of a powder 1 and water was added so as to make a paste. Said paste was stirred vehemently for 30 minutes and dried at 110°C for 16 hours. In this manner a powder was obtained which consisted of acicular $\alpha$-FeOOH particles covered with bismuth oxide. Related to the iron approximately 1 at.% of Bi was present (powder 3).

EXAMPLE 4

To solutions of 417 g of $FeSO_4.7H_2O$ in 5.7 litres of deionised water which furthermore contained 15 ml of concentrated $H_2SO_4$ was added $K_2TiO(C_2O_4)_2.2H_2O$, namely to the first solution 1.3 g, to the second solution 2.6 g, to the third solution 5.3 g and to the fourth solution 15.9 g. A flow of nitrogen of 12 liters per minute was led through each solution at 45°C, 2.3 liters of a 10 molar NaOH solution were then added, precipitates of titanium-containing iron oxide being formed. Related to the iron, the precipitate of the first solution contained 0.25 at. % of Ti, that of the second solution 0.5 at.% of Ti, that of the third solution 1 at.% of Ti and that of the fourth solution 3 at. % of Ti. The suspensions formed were heated to 45°C and a flow of air of 12 liters per minute was passed through, the precipitates being oxidized; after approximately 16 hours the reactions were completed. The products, acicular titanium-containing α-FeOOH particles having a length of on an average 0.4 μm and a thickness of on an average 0.02 μm were filtered off, washed with water in a centrifuge to a pH of 5.6, washed with acetone and dried in a vacuum furnace at 80°C (powders 4, 5, 6 and 7).

EXAMPLE 5

A quantity of powder 1 obtained by starting from 417 g of $FeSO_4.7H_2O$, was stirred in 5 liters of deionised water which was acidified with dilute sulphuric acid to pH 2.5. With vigorous stirring a solution of 5.3 g of $K_2TiO(C_2O_4)_2.2H_2O$ in 1 liter of water was added to said suspension which, related to the iron, corresponds to 1 at.% of Ti. The pH was adjusted at approximately 10 by means of a 2 molar NaOH solution. The suspension, acicular α-FeOOH particles covered with a titanium compound, was filtered off, washed with water in a centrifuge to a pH of 5 to 6, washed with acetone and dried in a vacuum furnace at 80°C (powder 8).

In another case a solution of 15.9 g of $K_2TiO(C_2O_4)_2.2H_2O$ in 1 liter of water was added to the same suspension of the powder 1 which, related to the iron, corresponds to 3 at.% of Ti. In this manner, acicular α-FeOOH particles covered with a titanium compound were also obtained (powder 9).

EXAMPLE 6

In a part of the cases the reduction of the powders was carried out as follows. Within 10 minutes they were heated in a dry nitrogen flow of 3 liters per minute to 250°C and then to the reduction temperature; this temperature was maintained for a given period of time, during which the powder was exposed to a dry hydrogen flow of 3 liters per minute. The products were passicated for approximately 16 hours under toluene, then filtered off and pumped to dryness in a vacuum desiccator between 4 and 16 hours. Powders 1, 3, 4, 6, 7 and 8 were reduced in this manner. Properties of the powders are recorded in the Table sub 1*a*, 1*b*, 3, 4, 6*a*, 6*b*, 7*a*, 7*b* and 8*a*, the reduction temperature and the time during which said temperature was maintained being also recorded.

EXAMPLE 7.

In the other cases the reduction of the powders was carried out as follows. 5–10 g of a powder were exposed in a rotating tube furnace of quartz at the reduction temperature for a given period of time to a dry hydrogen flow of 460 1 per hour and then slowly passivated at room temperature with a nitrogen-oxygen mixture. Powders 1, 2, 5 6, 7, 8 and 9 were reduced in this manner. Properties of the powders are recorded in the Table sub 1*c*, 2*a*, 2*b*, 5*a*, 5*b*, 6*c*, 7*c*, 8*b*, 8*c*, 9*a* and 9*b*, the reduction temperature and the time during which said temperature was maintained being also recorded.

Magnetic properties of the powders are recorded in the Table, namely the magnetisation coercive force $H_c$ expressed in $10^{-4}$ amp/m, the ratio between the magnetisation coercive force $H_c$ and the remanence coercive force $H_r$, the magnetic moment per kg in a field of $10^6$ amp/m $\sigma_s$ expressed in $10^4$ Wbm/kg, and the ratio between the remanent magnetic moment per kg after magnetisation in a field of $10^6$ amp/m $\sigma_r$ and the magnetic moment per kg in a field of $10^6$ amp/m $\sigma_s$. Furthermore are recorded the reduction temperature in °C and the time during which said temperature was maintained in minutes.

The powders had similar particle sizes and therefore the results of the examples can be compared with each other.

The magnetisation coercive force $H_c$ is determined by the shape of the particles and it has a higher value according as the needle shape of the particles is better maintained. The values of $H_c/H_r$ and of $\sigma_r/\sigma_s$ are decisive of the needle shape of said particles. The value of $\sigma_s$ is decisive of the quantity of metallic iron in the powders and thus indicates the extent of the reduction; the higher the value of $\sigma_s$ the further has the reduction proceeded.

When comparing the powders 4 to 9*b* with the powders 1 to 3 it is found inter alia from the values of $\sigma_r/\sigma_s$ that in the case of titanium upon heating at higher temperature the needle shape of the particles is maintained. Because sintering togehter of the acicular particles does not occur, high reduction temperatures may therefore be used.

EXAMPLE 8

Each time 92 g of either acicular tin-containing iron powder of acicular titanium-containing iron powder were dispersed in an organic binder system for 22 hours. After the addition of a lubricant the mixture was filtered off and provided on a polyester foil in tape form. The tape was moved through a directing magnetic field of $26.10^4$ Amp/m in the direction of transport of the tape and then dried. The tape was then calendered.

The directivity ratio of the tapes was measured and expressed in $I_{r_{//}}/I_{r_\perp}$, wherein $I_{r_{//}}$ is the remanent magnetisation measured in the plane of the tape in the direction of the directing magnetic field and $I_{r_\perp}$ the remanent magnetisation measured in the plane of the tape perpendicular to the direction of the directing magnetic field. In the case of tin-containing powders the directivity ratio was from 1.3 to 1.6 and in the case of titanium-containing powders it was from 1.8 to 1.9. From this it may be concluded that titanium-containing powders during the manufacture of a magnetic tape have a good dispersibility.

TABLE

| Powder | Reduction temp. | Reduction time | $H_c$ | $\frac{H_c}{H_r}$ | $\sigma_s$ | $\frac{\sigma_r}{\sigma_s}$ |
|---|---|---|---|---|---|---|
| 1a | 330 | 90 | 4.10 | 0.69 | 2.17 | 0.27 |
| 1b | 400 | 60 | 2.35 | 0.61 | 2.35 | 0.16 |
| 1c | 320 | 75 | 4.70 | 0.71 | 2.24 | 0.30 |
| 2a | 380 | 75 | 6.87 | 0.73 | 2.04 | 0.38 |
| 2b | 450 | 75 | 3.53 | 0.62 | 2.15 | 0.21 |
| 3 | 400 | 60 | 4.94 | 0.69 | 2.14 | 0.29 |
| 4 | 340 | 90 | 7.96 | 0.76 | 2.12 | 0.40 |
| 5a | 310 | 75 | 0.51 | 0.83 | 1.98 | 0.47 |
| 5b | 340 | 75 | 8.55 | 0.80 | 2.04 | 0.44 |

TABLE -Continued

| Powder | Reduction temp. | Reduction time | $H_c$ | $\frac{H_c}{H_r}$ | $\sigma_s$ | $\frac{\sigma_r}{\sigma_s}$ |
|---|---|---|---|---|---|---|
| 6a | 330 | 90 | 10.83 | 0.80 | 1.73 | 0.46 |
| 6b | 400 | 60 | 9.87 | 0.81 | 1.98 | 0.47 |
| 6c | 370 | 75 | 10.08 | 0.79 | 1.94 | 0.47 |
| 7a | 400 | 60 | 10.51 | 0.77 | 1.28 | 0.40 |
| 7b | 450 | 60 | 10.11 | 0.78 | 2.02 | 0.43 |
| 7c | 450 | 75 | 10.11 | 0.84 | 1.77 | 0.48 |
| 8a | 400 | 60 | 8.99 | 0.75 | 1.83 | 0.42 |
| 8b | 370 | 75 | 10.87 | 0.77 | 1.83 | 0.46 |
| 8c | 400 | 75 | 8.69 | 0.75 | 1.92 | 0.42 |
| 9a | 370 | 75 | 12.72 | 0.79 | 1.53 | 0.45 |
| 9b | 400 | 75 | 11.89 | 0.81 | 1.74 | 0.47 |

What is claimed is:

1. A method of preparing a metal powder mainly consisting of iron by reduction of finely divided acicular iron oxide or iron oxide hydrate with a gaseous reduction agent, characterized in that the iron oxide particles or the iron oxide hydrate particles contain at least 0.1 at.% and at most 10 at.% of titanium relates to the iron.

2. A method as claimed in claim 1, characterized in that the iron oxide particles or the iron oxide hydrate particles contain at least 0.2 at.% and at most 4 at. % of titanium related to the iron.

3. A method as claimed in claim 1, characterized in that the iron oxide particles or the iron oxide hydrate particles are doped with titanium.

4. A method as claimed in claim 1, characterized in that the iron oxide particles or the iron oxide hydrate particles are covered with a layer of a titanium compound.

* * * * *